May 8, 1962   R. D. PICKERING ETAL   3,033,980
DIFFUSE LAMPHOUSE FOR PHOTOGRAPHIC PROJECTION PRINTING
Filed Feb. 26, 1960   2 Sheets-Sheet 1
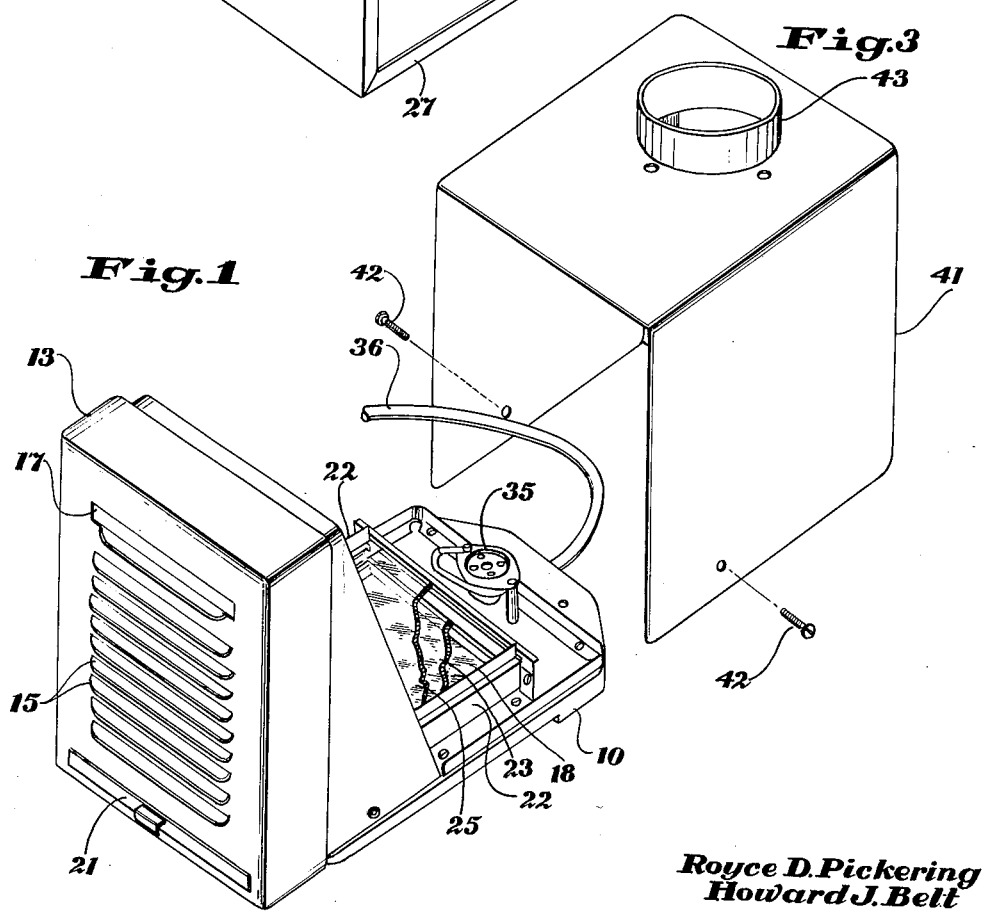
Royce D. Pickering
Howard J. Belt
INVENTORS
BY
ATTORNEYS

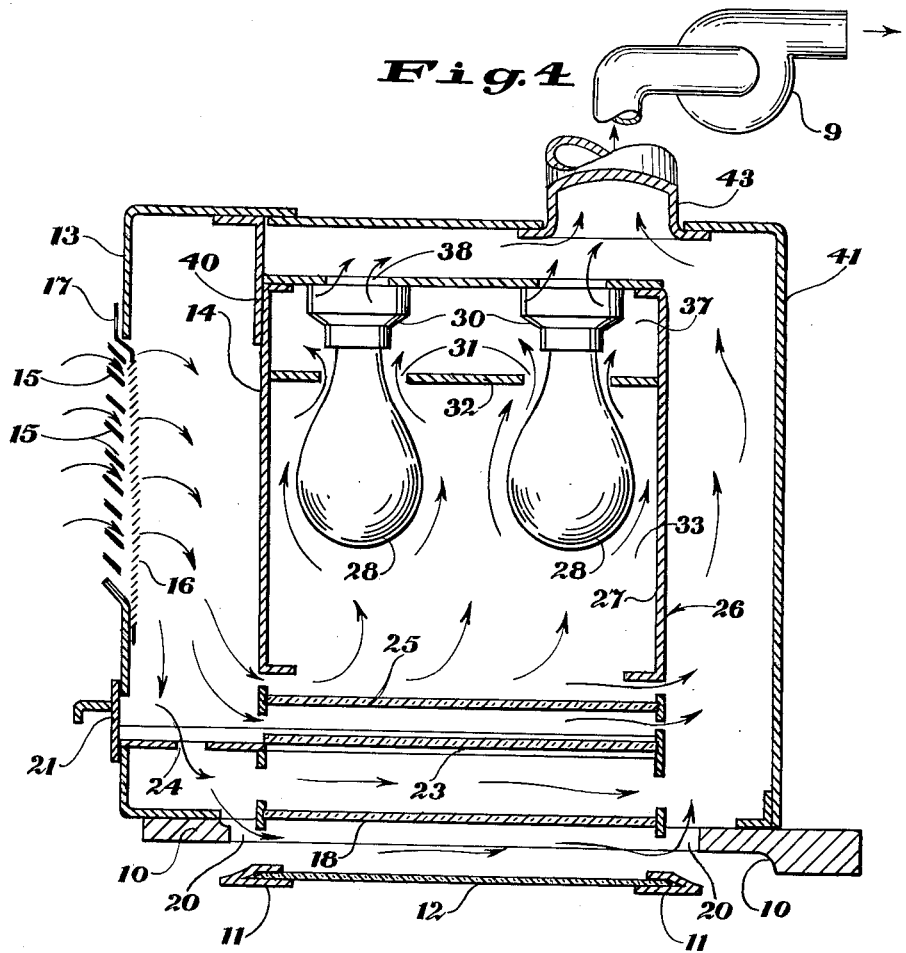

United States Patent Office 3,033,980
Patented May 8, 1962

3,033,980
DIFFUSE LAMPHOUSE FOR PHOTOGRAPHIC PROJECTION PRINTING
Royce D. Pickering and Howard J. Belt, Rochester, N.Y., assignors to Eastman Kodak Company, Rochester, N.Y., a corporation of New Jersey
Filed Feb. 26, 1960, Ser. No. 11,326
3 Claims. (Cl. 240—47)

The present invention relates to photographic enlargers and more particularly to a diffuse light lamphouse for such an enlarger.

In making photographic prints by optical projection, it is possible to effect a material reduction in print defects caused by dust and scratches on the negative or transparency by using diffuse illumination in the enlarger. In the past such diffuse illumination in enlargers has usually been achieved either at the cost of reduced printing speed or by increasing the lamp size to a point where the increased heat produced thereby endangers the optical components and the negative or transparency being printed.

One object of this invention is to provide a diffusion-type lamphouse for photographic printers capable of producing a light output equivalent to that of condenser-type systems and in which the temperatures of the negative or transparency and of the optical components of the lamphouse are maintained at safe levels. Another object of the invention is to provide such a lamphouse including an easily exchangeable light filter. Still another object of the invention is the provision of such a lamphouse which is of simple construction and which may be readily disassembled to facilitate cleaning and replacement of components. These and other objects and advantages reside in certain novel features of construction, arrangement and combination of parts as will hereinafter be more fully set forth and pointed out in the appended claims.

Referring to the drawings:

FIG. 1 is a perspective view of the main body member of the lamphouse including the various optical components thereof;

FIG. 2 is a perspective view of the removable light integrating box containing the light source for the lamphouse broken away to show the internal construction thereof;

FIG. 3 is a perspective view of the removable cover member of the lamphouse; and, FIG. 4 is a schematic sectional vertical view of the lamphouse and a schematic representation of the exhaust blower showing the arrangement of the various elements of the lamphouse an indicating the path of the cooling air by means of arrows.

The complete lamphouse structure comprises three principal parts; the main body unit illustrated in FIG. 1, the light source and the light integrating box associated therewith as shown in FIG. 2, and the removable cover member shown in FIG. 3. A centrifugal exhaust blower 9, shown schematically in FIG. 4 is provided to draw cooling air through the lamphouse as described later.

Referring now to FIGS. 1 and 4, the main body member comprises a base plate 10 adapted to be mounted atop the enlarger head directly over holder 11 in which the photographic negative or transparency 12 is located.

A vertical sheet metal hood 13 is attached to the front edge of the base plate 10 and serves as a light trap and, in cooperation with the front wall 14 of the integrating box, as an air manifold as shown in FIG. 4. Louvers 15 are provided in the front surface of this hood and cooperate with oppositely angled louvers of a removable section of louvered screen 16, such as is commonly used for window screening purposes, to allow a free passage of cooling air into the lamphouse while preventing the escape of light through the air intake passage. A supporting strip 17 is attached to the top edge of member 16 and projects through a slot in the hood to allow the screen 16 to be withdrawn for cleaning.

A light diffusing element 18 is mounted in the base plate 10, which is provided with openings 20 adjacent the front and rear edges of the diffuser to allow air to flow from front to rear over the bottom surface of this element and over the top surface of the negative or transparency 12 as seen in FIG. 4. A drawer 21, located toward the bottom of the front hood and supported by guide rails 22 attached to the base plate, is adapted to locate a selected light filter member 23 above the diffuser element 18. A slot 24 is provided in the drawer to allow the passage of cooling air between the top surface of the diffuser element 18 and the bottom surface of filter element 23, as shown in FIG. 4. Above the light filter 23, a heat absorbing element 25 is provided. This element is likewise supported by guide rails 22 and provision is made to allow the passage of cooling air over both planar surfaces of this element and over the top surface of filter element 23. Referring now to FIGS. 2 and 4, the integrating box 26, containing the light source, comprises an open ended rectangular sheet metal box 27, containing one or more lamp bulbs 28. In the preferred embodiment shown in the drawings, four bulbs 28 are mounted in sockets 30 with the necks of the bulbs projecting through oversize holes 31 in a partition 32 that separates the integrating box into two chambers. By thus removing the sockets from the lower light integrating chamber 33, the size of this chamber may be reduced for greater efficiency. The utilization of a plurality of bulbs allows the light intensity to be varied by illuminating different numbers of bulbs. The sockets 30 are individually connected by plug 34 to socket 35 on the base plate to facilitate the removal of the light integrating box unit from the lamphouse. Socket 35, in turn is connected by cord 36 to an appropriate switch (not shown) whereby the illumination of various combinations of the incandescent bulbs may be controlled. In the event that only one bulb is mounted in the integrating box, the total light output may be regulated by varying the current delivered to the bulb. This method of regulating the light output, however, is often undesirable because the spectral characteristics of the light will vary according to its intensity. The inside surfaces of the lower light integrating chamber 33 are painted or otherwise provided with a light reflective surface to provide a uniform distribution of light at the open end of the integrating box. As shown in the drawings, air is circulated upwardly through the integrating box and is directed around the bulbs by the holes 31 in the partition 32 through which the necks of the bulbs extend into the upper chamber 37. As the cooling air flows into the upper chamber 37, it is drawn out through openings 38, located between the sockets. The entire integrating box unit shown in FIG. 2 is removable from the lamphouse for cleaning and for replacing the bulbs. In its operative position the unit is supported by guide rails 22 and abuts against strip 40 attached to hood 13, the front wall of the unit thus serving as the rear wall of the air intake manifold as previously described.

The removable cover member 41 shown in FIG. 3 is formed from sheet metal and is attached to the main body member by screws 42. The edges of the cover cooperate with baffles on the adjoining portions of the body member to prevent the escape of light and to make these junctions relatively air tight. A tubular manifold 43 in the top surface of the cover member is provided for connecting the lamphouse to the blower 9.

As air is exhausted from the lamphouse by blower 9 through manifold 43, cool air is drawn into the unit through the front louvers 15 and, as illustrated in FIG.

4, is circulated over both surfaces of the optical elements, over the top surface of the negative or transparency and around the bulbs. This efficient system of cooling the lamps and optical components, in conjunction with the efficient light integrating means, makes it possible to obtain a light output comparable to that of a condenser type lamphouse of the same size without danger of overheating the various heat sensitive components.

Other modifications of the invention will be clear to those skilled in the art and the present invention is to be limited only by the scope of the appended claims.

Having now particularly described our invention what we desire to secure by Letters Patent of the United States and what we claim is:

1. A lamphouse for a photographic projection printer using a plurality of incandescent lamps and adapted to be provided with an exhaust blower, said lamphouse comprising a horizontally disposed apertured base plate, a vertical hood attached to said base plate at the front edge thereof and extending at right angles thereto, louvered means in said hood providing a free path for air movement through a section of the front wall thereof while blocking passage of light therethrough, a cover removably attached to said base plate and said hood to provide a box-like enclosure with said base plate and said hood forming two walls thereof, a manifold attached to said cover and adapted to be connected to said exhaust blower for drawing cooling air through said enclosure, a light diffusing element horizontally disposed in alignment with said aperture in said base plate, means for interchangeably mounting a filter element above and in parallel spaced relation to said light diffusing element; a heat absorbing element located above and in parallel spaced relation to said filter element, a light integrating box, means removably supporting said light integrating box within said enclosure and in spaced relation to the walls thereof said light integrating box having a downwardly facing open end above and in spaced relation with respect to said heat absorbing element, means for mounting said plurality of incandescent lamps in said light intergrating box, said light integrating box having vents which in combination with said open end provide a vertical passageway for air through said box and around said plurality of incandescent lamps, and means for supporting said elements and said integrating box in the specified spaced relation to one another and to said enclosure to provide a free passage of air from front to rear over the top and bottom surfaces of each of said elements as well as through said integrating box.

2. A construction as described by claim 1 including electrical conductors associated with said means for mounting said plurality of incandescent lamps whereby electrical current may be delivered to selected ones of said incandescent lamps.

3. A construction as described by claim 1, wherein said light integrating box comprises a rectangular box, the bottom end thereof being open, a plurality of downwardly facing lamp sockets attached to the top wall of said box, a horizontally disposed partition toward the top end of said box dividing said box into an upper chamber and a lower chamber, said partition provided with a plurality of apertures, each of said apertures being coaxial with a corresponding one of said sockets, each of said sockets adapted to locate one of said incandescent lamps in said lower chamber with the base portion of said lamp extending upwardly through the corresponding one of said apertures in said partition, each of said apertures being sufficiently large to provide a passageway for air therethrough when the base portion of a lamp is extending therethrough, and ventilating means in the top wall of said box providing a passageway for air therethrough.

References Cited in the file of this patent
UNITED STATES PATENTS

| | | |
|---|---|---|
| 2,294,585 | Thomson | Sept. 1, 1942 |
| 2,312,561 | Leonard | Mar. 2, 1943 |
| 2,614,470 | Hellmer et al. | Oct. 21, 1952 |
| 2,857,508 | Klugman | Oct. 21, 1958 |